United States Patent [19]

Heath et al.

[11] 4,305,895
[45] Dec. 15, 1981

[54] BUBBLE CAP AND RISER CONSTRUCTION

[76] Inventors: Rodney T. Heath, 4901 E. Main St.; Richard G. Ayres, 609 N. Orchard, Apt. F., both of Farmington, N. Mex. 87401

[21] Appl. No.: 147,061

[22] Filed: May 5, 1980

Related U.S. Application Data

[63] Continuation of Ser. No. 16,936, Mar. 2, 1979, abandoned.

[51] Int. Cl.³ .............................................. B01F 3/04
[52] U.S. Cl. ............................ 261/114 A; 261/114 R; 202/158
[58] Field of Search ........ 261/114 A, 114 TC, 114 R; 202/158; 285/397, 398

[56] References Cited

U.S. PATENT DOCUMENTS

| | | | |
|---|---|---|---|
| 398,068 | 2/1889 | McEwan | 285/397 |
| 973,795 | 10/1910 | Lummus | 261/114 A |
| 1,774,581 | 9/1930 | Winkler et al. | 261/114 A |
| 1,808,276 | 6/1931 | Widdell | 261/114 A |
| 2,091,085 | 8/1937 | Scholtes | 285/397 |
| 2,301,707 | 11/1942 | Rocke | 261/114 R |
| 2,494,372 | 1/1950 | Wilson | 261/114 A |
| 2,510,556 | 6/1950 | Collins et al. | 261/114 A |
| 2,510,586 | 6/1950 | Kelley | 261/114 A |
| 2,921,777 | 1/1960 | Hepp | 261/114 A |
| 3,197,286 | 7/1965 | Farkas et al. | 261/114 A |
| 3,427,007 | 2/1969 | Braun | 202/158 |

FOREIGN PATENT DOCUMENTS

| | | | |
|---|---|---|---|
| 739358 | 9/1943 | Fed. Rep. of Germany | 261/114 A |
| 1,029,074 | 5/1953 | France | 261/114 A |
| 688181 | 2/1953 | United Kingdom | 261/114 A |

*Primary Examiner*—Gregory N. Clements
*Attorney, Agent, or Firm*—Richard D. Law; Dennis K. Shelton

[57] ABSTRACT

A vapor riser for a bubble cap formed of plastic material is threadedly attached to a plate in a rectifying column, and a plastic bubble cap is secured to the riser. The bubble caps are releasably secured by integral, interlocking elements on the risers and bubble caps.

1 Claim, 11 Drawing Figures

BUBBLE CAP AND RISER CONSTRUCTION

This is a continuation, of application Ser. No. 016,936, filed Mar. 2, 1979, abandoned.

Mixtures of volatile liquids are traditionally separated by a distillation process, including fractionation processes. One type of equipment extensively used for fractionation is a tray column with bubble caps on each of vertically spaced trays. Some fractionation columns are very large, particularly in the petroleum industry, both as to height and diameter. These columns or towers have a plurality of trays, spaced one above the other. Each tray has means to contain liquid and means to pass vapor and extrained liquid through the liquid on the trays. The vapor and entrained liquid pass through bubble caps from below the tray through the liquid on the tray.

Conventional construction of a tray is metal plate which is pierced with a plurality of holes. Short tubes are secured in the holes extending a short distance above the tray or plate, serving in effect as a chimney for the vapor passing through the tray. Caps are placed on the tubes to direct the vapors into the liquid. The principal construction has been a welded construction which causes warping, etc. These are difficult to service in the tower. Various types of construction have been suggested, but cost is one major factor which must always be considered, i.e. cost as to original construction and cost of serving, etc.

OBJECTS OF THE INVENTION

Included among the objects and advantages of the invention is to provide an improved riser and bubble cap construction for fractionation column.

Another object of the invention is to provide synthetic plastic risers with a simple installation system for the perforated plates of a fractionation column.

Yet another object of the invention is to provide synthetic plastic bubble caps which are arranged for a simple, snap fastening onto risers.

Still another object of the invention is to provide synthetic plastic risers and bubble caps which may be inexpensively manufactured and simply and easily installed or dismantled from a plate for a fractionating column.

GENERAL DESCRIPTION OF THE DRAWINGS

Other objects and advantages of the invention may be ascertained by reference to the following description and appended illustrations, in which.

SPECIFIC DESCRIPTION OF THE DRAWINGS

The modifications of the vapor caps and risers of the invention are formed of synthetic plastic polymers, hereafter called plastics, which are easily molded, preferably by injection molding, and which are impervious to environment and temperatures to which they are subjected. The petroleum industry is involved in the separation of components of straight run petroleum products, reformed petroleums, cracked petroleums, and the like, which are hydrocarbons, and hydrocarbons containing other elements than hydrogen and carbon. The industry uses great numbers of fractionating or rectifying columns in a temperature range of from some less than 0° C. to 250° C. or more (boiling range of the major products from a rectifying tower). The plastic must, therefore, be impervious to the solvent or absorption characteristics of the petroleum products and maintain stability in the temperature range of use. Some plastics having high resistance to petroleum products includes acetals, some allye resins, epoxy resins, floro plastics, melamine-formaldehyde, poly (amideimide), polyesters, polyurethanes, some vinyls, etc.

Figure 1:
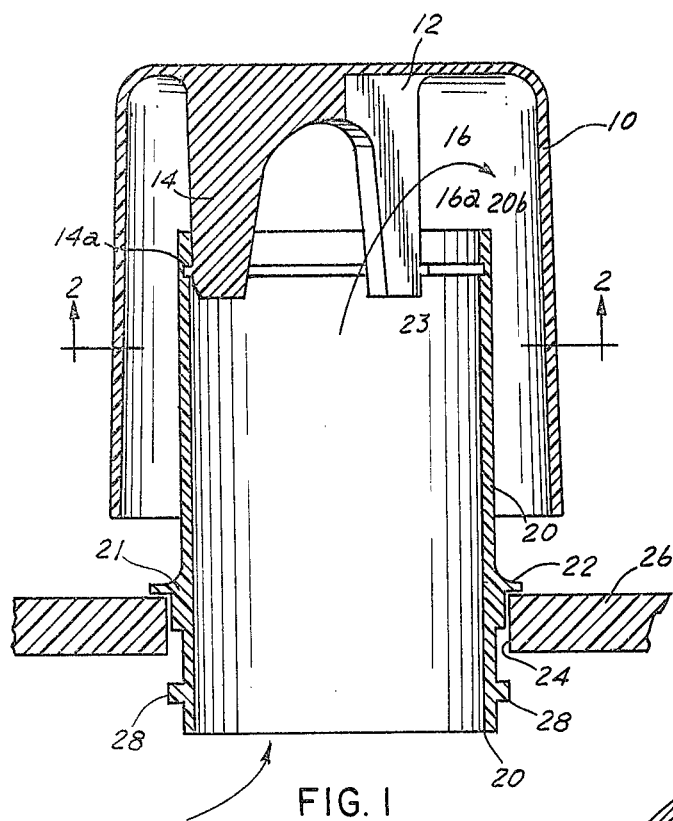
FIG. 1 is a cross sectional view of one form of vapor cap and riser mounted in a plate, according to the invention.
Figure 2:
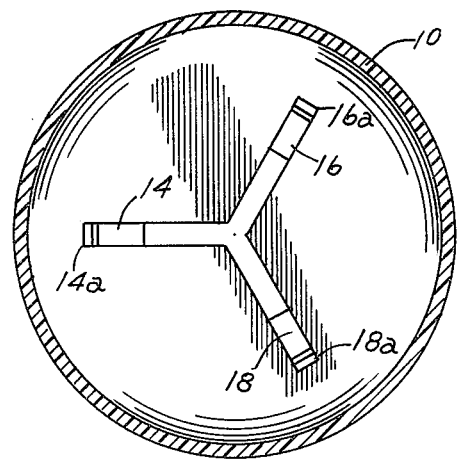
FIG. 2 is a cross sectional view of the vapor cap of FIG. 1 taken on section lines 2—2.

In the device illustrated in FIG. 1, a vapor cap 10 is molded in a cup shape with a web 12 integrally formed on the interior top of the cap. The cap tapers outwardly from the lateral wall to the opening, so the inverted position the bottom outlet is larger than the top wall. Web includes three projections 14, 16 and 18 with a central opening between the projections. Each projection includes an end and a lateral flange, for example 14a, 16a and 18a. A riser tube 20 with an exterior shoulder 22 encircling the tube at a point spaced from the opening 20a is telescoped in a bore 24 in a plate or tray 26. The shoulder includes a thickened wall section 21 which loosely telescopes in the bore, but prevents tilting of the tube. A plurality of thread stubs 28 project outwardly from the exterior of the tube below the shoulder. The tube opening 20b permits the projections of the cap to telescope therein, and an internal groove 23 is sized to accept the projections 14a, 16a and 18a thereby securing the cap on the riser. The plastic material permits the cap projections 14, 16 and 18 to deform as the cap is pushed onto the tube, the out edge of the ends of the projects are chambered to aid insertion into the tube, so that when the projections 14a, 16a and 18a are pushed into the groove 23, the projections resume original shape and position, thus snapping onto the tube. The cap is securely held on the riser tube.

Figure 3:
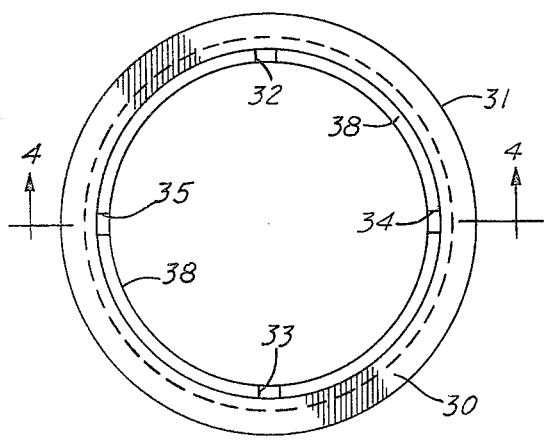
FIG. 3 is a top plan view of a fastening ring for a riser tube of the invention.
Figure 4:
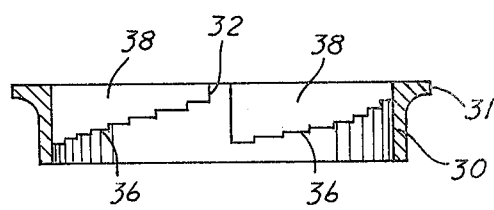
FIG. 4 is a cross sectional view of the fastening ring of FIG. 3, taken on section lines 4—4.

The riser tube is secured to the plate by means of a nut or fastener threaded onto the bottom of the riser tube after telescoping in the bore in the plate. For this purpose, a nut 30, FIGS. 3–4, is a short tubular member with an internal diameter of a size to telescope over the end of the tube 20. Extending along the inner wall of the tube 30 are stepped bottoms 36 of a thin wall 38 superimposed on the inner wall of tube 30, generally of a thickness approximating the length of extension 28 on the riser tube. The nut may be pushed up on the tube 20 with the slots in the nut, and the nut threaded on to the riser tube by turning it to a light fit where the projections seat in one of the levels of the steps 36. The steps securely hold the nut on the tube, and tightly secures the tube on the plate. Once secured, vapor travel is up the riser tube over its top and down the cap to its bottom opening. In some instances, the bottom of the vapor cap may be notched, scalloped, slotted, or the like is desired.

Figure 5:
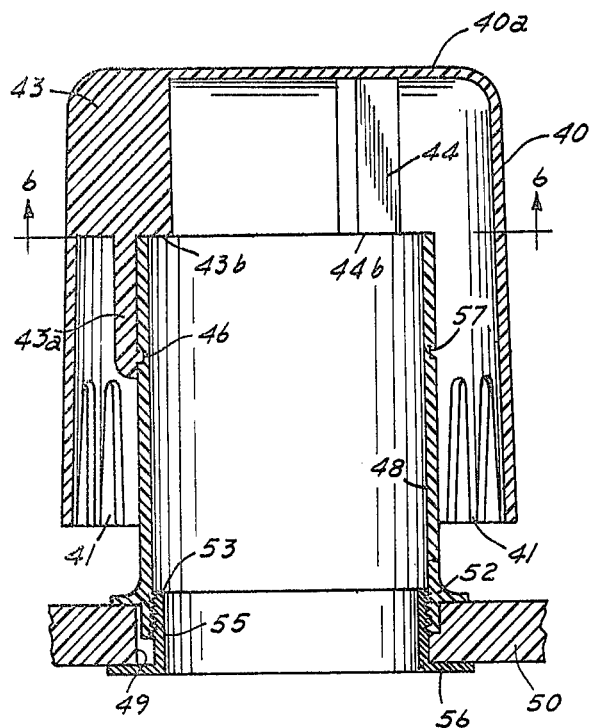
FIG. 5 is a cross sectional view of a modified vapor cap and riser according to the invention.

The modification of FIG. 5 includes a vapor cap 40 of a deep cup shaped design, having a slotted bottom with a plurality of slots 41 spaced around the wall of the opening of the cap, and extending along the wall of the cup to provide the desired discharge of vapor into the liquid on top of the plate. The cap 40 includes three internal projections 43, 44, and 45, which are integral with the cap extending along the inner diameter of the cap a short distance from the lateral wall 40a of the cap 40. The projections 43, 44 and 45 have depending legs 43a, (44a and 45a not shown) which are spaced from the inner wall of the cap leaving a small space therebetween. Each leg includes an inwardly projecting lateral flange segment 46 which is arranged to snap into an external groove in a riser tube, explained below. The projections 43, 44 and 45 provide a seat 42b, 44b, etc., which seat on the top of the riser tube.

A riser tube 48 is telescoped in a bore 49 in a plate 50 and seats by external flange 52 on the top of plate 50. The interior of the tube may be threaded at 53 so as to threadedly engage a short tube 55, which is externally threaded, having a lateral flange 56 for seating on the bottom of the plate. The tube includes an external groove 47 for accepting the flange sections 46 thereby holding the cap on the tube. The plastic leg parts deform as the cap is pushed over the end of the riser tube 48, and the legs snap back into place when the flange parts drop into the groove 57.

The riser tube is quickly and easily assembled or disassembled by threading or unthreading the nut into the tube. The flange 52 on the tube and the flange 56 on the nut aid in sealing the bore in place, forcing vapor through the tube without leakage.

Figure 6:
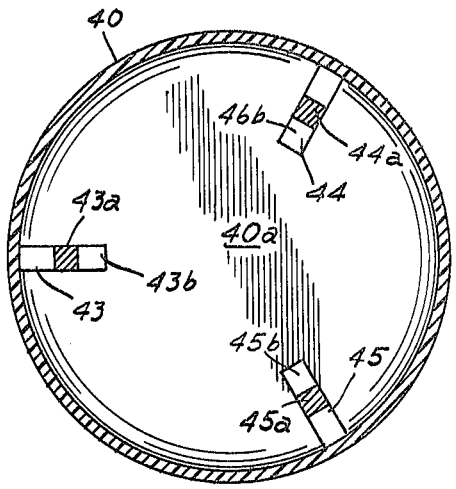
FIG. 6 is a cross sectional view of the vapor cap of FIG. 5, taken along section lines 6—6.
Figure 8:
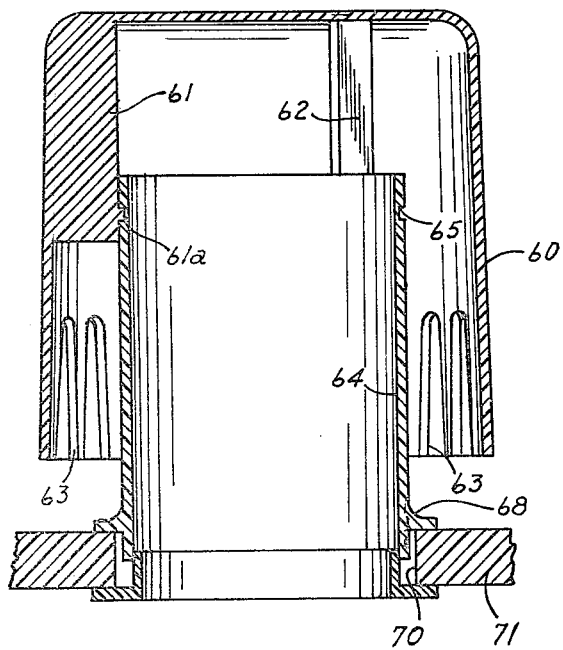
FIG. 8 is a cross sectional view of a further modified form of a vapor cap and riser according to the invention.
Figure 7:
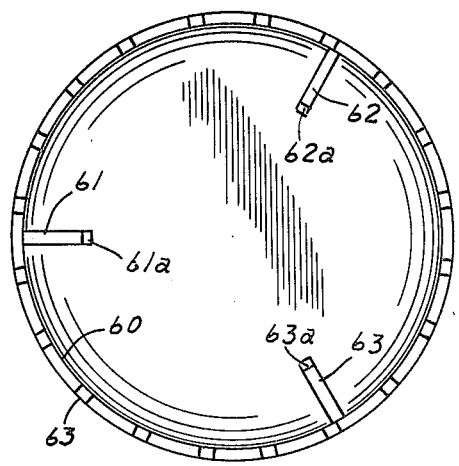
FIG. 7 is a bottom plan view of the vapor cap of FIG. 5.
Figure 9:
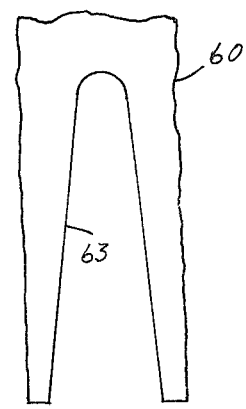
FIG. 9 is an enlarged detail view of a vapor opening for a vapor cap according to the invention.

The modification of FIG. 8 includes a cap 60, with three projections 61, 62 and 63, projections 61 and 62 being shown in FIG. 8, uniformly spaced around the inside of the cap. The projections include groove riding projections 61a etc., which seat in a groove 65 of riser tube 64. The projections are integral with the cap providing a means of supporting the cap on a riser tube. The cap includes bottom slits 63 uniformly spaced around the opening of the cap wall. The riser 64 includes a plate seating flange 68 externally of the tube and a nut 69, similar to that of FIG. 6, holds the tube in a bore 70 in plate 71.

Figure 11:
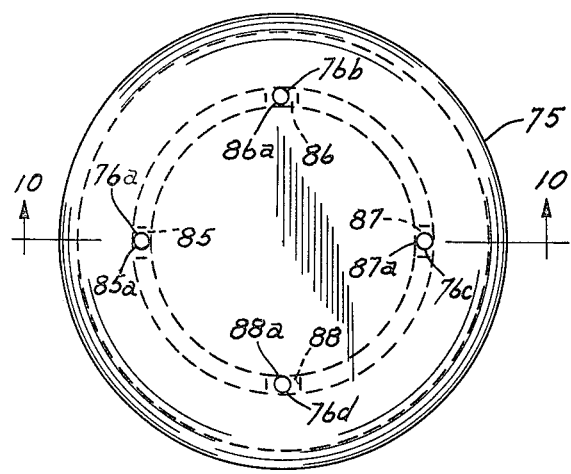
FIG. 11 is a top plan view of the device of FIG. 10.
Figure 10:
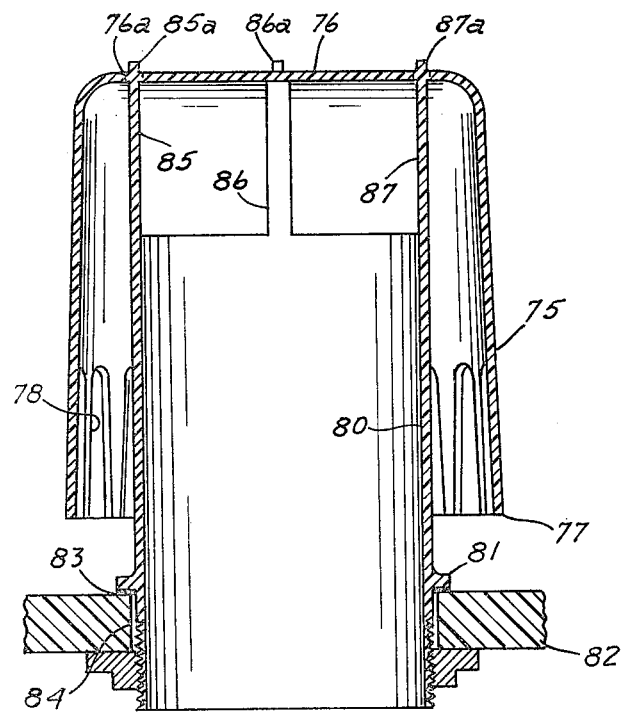
FIG. 10 is a cross-sectional side elevational view of a further modified bubble cap and riser.

The modification of FIGS. 10 and 11 includes a bubble cap of a cup shape having a side wall 75 sloped from lateral wall 76 to a full opening 77. The cap includes a series of equally spaced slots 78 around the opening of the cap for agitation and mixing of vapor and liquid held on the rectifier plate. A riser tube 80 includes a exterior flange 81 arranged to seat flush on a rectifier plate 82. A gasket 83 provides sealing of the tube in a bore 84 in the plate. The tube has exterior threads 86 adjacent the lower opening of the tube, and a threaded nut secures the tube to the plate. A gasket may, also, be used between the nut and the plate. At the upper portion of the tube, a series of cut-outs leave wall extensions 85, 86, 87 and 88 which extend axially from the tube wall. These extensions terminate in cylindrical end portions 85a, 86a, and 88a which telescope through spaced openings 76a, 76b, 76c and 76d in the lateral wall 76 of the cap. The cylinders protrude through the cap so they may be sonically, or otherwise, molded to the cap, producing a completed unit in which the cap is securely fastened to the tube. In this modification, the cap is not intended to be removed from the tube. Also, the cut-out wall sections permit free flow of vapor coming up the tube, down the annulus between the tube and the cap to the slots.

In most instances, according to the invention, the cap may be placed on the riser tube, which then may be mounted in the bore and secured by the nut. In the prior art, normal installations of bubble caps does not require welding risers to the tray, however, some welding is performed in the construction of the caps and holddowns. This welding can and does cause trouble with the caps. With the invention, the caps and risers may be disassembled or unassembled on existing towers through man holes while the column is erect. The savings in man power for maintenance is thus very significant, as well as the savings for the initial installation.

What is claimed is:

1. A synthetic plastic bubble cap and riser apparatus, comprising:
   (a) a synthetic plastic cup-shaped bubble cap having at least three equally spaced, integral, axially depending legs secured to the internal top of the cap, each leg having a radially outwardly extending projection on a lower end thereof;
   (b) a synthetic plastic tubular riser having an external flange on a first end of the riser adapted to be seated on a bore in a rectifier tray and having a second end telescoped around the legs and into the bubble cap, the riser having an internal groove extending around the internal surface of the riser for receiving and releasably seating the projections on the legs to releasably secure the bubble cap on the riser in a spaced relationship above the upper surface of the rectifier tray thereby permitting the passage of fluids through the riser and out the lower edge of the bubble cap; and
   (c) means including threads on the riser adjacent the flange for releasably securing the tubular riser in a bore in a rectifier tray.

* * * * *